Oct. 23, 1945.    L. H. BAILEY    2,387,489
JOLLY BALANCE
Filed June 14, 1945    2 Sheets-Sheet 1
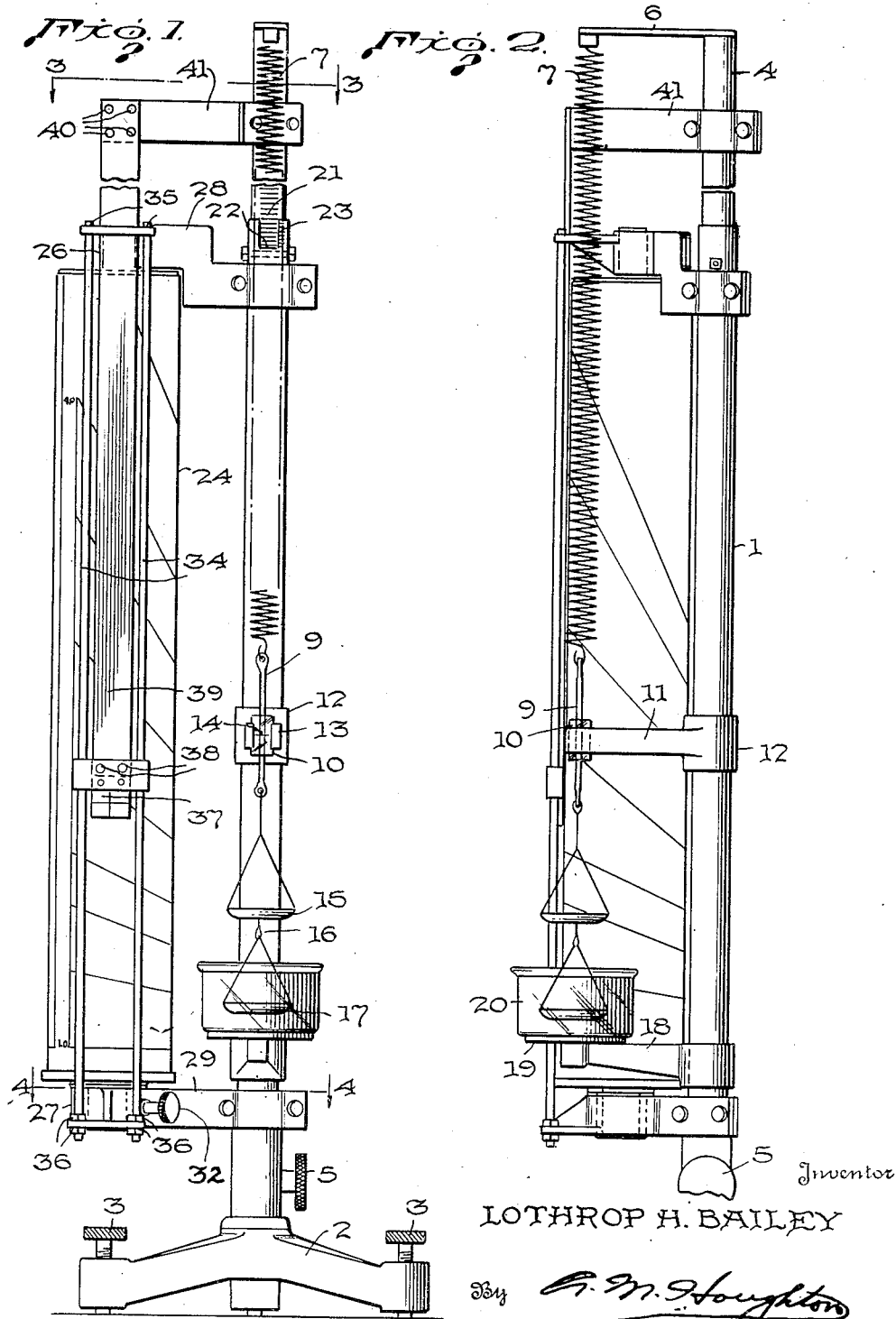
Inventor
LOTHROP H. BAILEY Oct. 23, 1945.    L. H. BAILEY    2,387,489
JOLLY BALANCE
Filed June 14, 1945    2 Sheets-Sheet 2
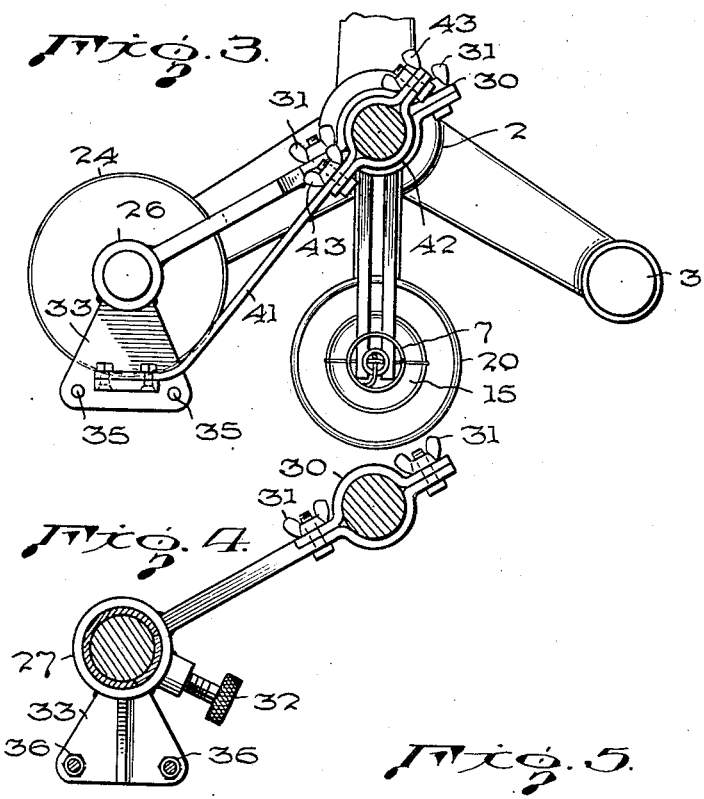
Fig. 3.
Fig. 4.
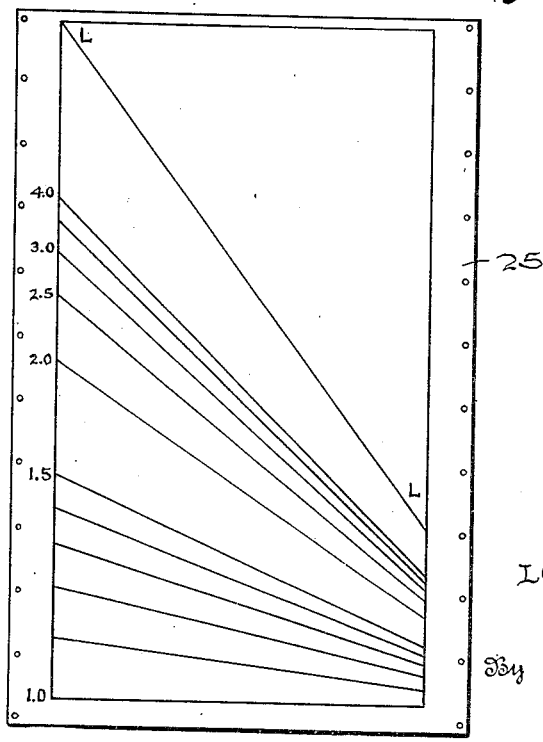
Fig. 5.
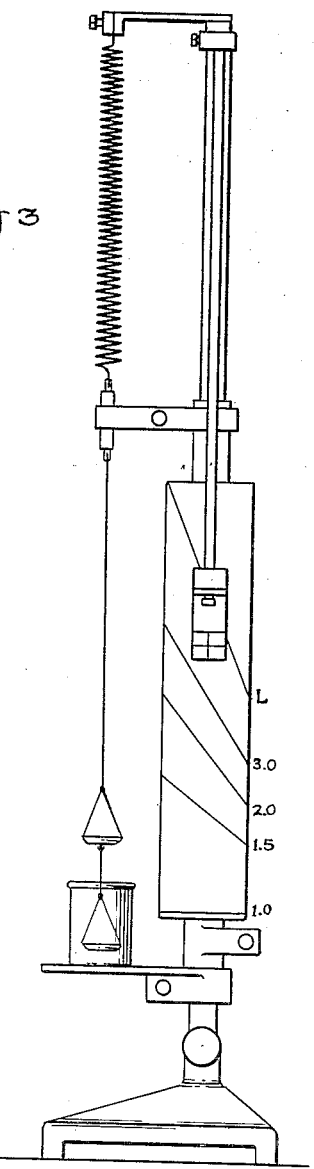
Fig. 6.
Inventor
LOTHROP H. BAILEY
By
His Attorney Patented Oct. 23, 1945

2,387,489

UNITED STATES PATENT OFFICE 2,387,489

JOLLY BALANCE

Lothrop H. Bailey, Penn Township, Allegheny County, Pa., assignor to Gulf Research & Development Company, Pittsburgh, Pa., a corporation of Delaware Application June 14, 1945, Serial No. 599,365

7 Claims. (Cl. 73—32)

This invention relates to apparatus useful for determining density or specific gravity, and more particularly to an improved Jolly balance.

A Jolly balance is a type of spring balance commonly used for measuring the density or specific gravity of a body. In operating the usual Jolly balance to measure densities of bodies heavier than water, it is necessary first to note the balanced position of the spring with the scale pans empty. For convenience the spring is customarily balanced at zero. Then the body, the density or specific gravity of which is to be determined, is placed on the highest of the two scale pans and its weight in air noted. Next, the weight of the body in water is determined by placing the body upon the lower scale pan and immersing the pan with the body on it in water. Having obtained these three readings, it is necessary in order to find the density of the body to subtract the reading of the spring when balanced with no load on the scale pans from the weight of the body in air to find the weight of the body. The weight of the body in water is next subtracted from its weight in air to give the weight of a volume of water equal in volume to the volume of the body. The difference obtained in the first subtraction is then divided by the difference obtained in the second subtraction, and the quotient represents the specific gravity or density of the body.

Thus it may be seen that a single determination requires the operator to take three readings and make two subtractions and one division. This is time consuming and particularly laborious where, for instance, in making geological surveys hundreds of such determinations must be made.

In avoidance of the above, balances have heretofore been devised which are in effect direct reading, i. e. which indicate directly the density of the body undergoing measurement, without the necessity of separately making the notations and calculations above described. These prior direct reading balances, however, have not proven entirely satisfactory. Most such prior balances operate differently from the Jolly balance and require a different technique. This may be responsible in part, for their unpopularity. Jolly balances heretofore developed to indicate densities directly, are cumbersome in operation and require most careful handling in order to obtain results of high, uniform accuracy.

The present invention has to do with an improved Jolly balance of the direct reading type and it is an object of the invention to provide an improved Jolly balance including in combination, an attachment for enabling the balance to give or indicate directly the density or specific gravity of substances measured therewith.

A further object of the invention is the provision of a Jolly balance of conventional design provided with a rotatable cylindrical scale calibrated to show densities, and a reticule arranged to move along an element of the cylinder by attachment to a rod which in turn is attached to the top of the usual sliding scale supporting the spring in such balances.

A further object of the invention is the provision of means attachable to the usual Jolly balance for enabling direct density readings to be accomplished, which means does not in any way interfere with the normal use or reading of the balance.

A still further object of the invention is the provision of direct reading attachment means which may be secured to and removed from a Jolly balance by simply clamping or unclamping component parts of the attachment to the balance.

Other objects and advantages of the invention will be apparent from the following description, when read in light of the accompanying drawings. In the drawings, wherein for purposes of illustration there are shown two forms of a specific embodiment of the invention:

Fig. 1 is a front view in elevation of the Jolly balance of the present invention, showing the direct reading attachment secured in position thereon, Fig. 2 is a side view in elevation of the balance shown in Fig. 1;

Fig. 3 is a horizontal, sectional view of the apparatus taken along lines 3—3 of Fig. 1;

Fig. 4 is a detail, horizontal, sectional view, taken above line 4—4 of Fig. 1 and shows the bottom support and clamping arrangement for the cylindrical rotatable scale;

Fig. 5 is a plan view of the chart or scale before it is applied to the cylindrical support, and Fig. 6 is a front, elevational view of a modified form of the invention.

Referring to the drawings wherein for purposes of illustration, like numerals indicate corresponding parts throughout the several views, 1 indicates the vertical standard of a conventional type Jolly balance provided with the usual tripod base 2 and leveling screws 3. In brief, the standard consists of a hollow tube in which there is telescopically fitted a second tube 4, adapted to slide in and out of the standard and to be adjusted in any such position by means of the knurled thumb screw 5. Thumb screw 5 operates the usual mechanism, not shown, for accomplishing this result. Tube 4, sometimes referred to as a sliding spring support, has rigidly attached to it at its top end and arm 6, to the outer end of which is connected coil spring 7 of the balance. Spring 7 has connected to it at its lower end a link 9 which has a sliding, frictionless fit, in a short section of glass tubing 10 carried on an arm 11 secured to standard 1, as shown at 12. Glass tube 10 slidably fits within a split friction grip 13 on the end of arm 11 and is scored intermediate its ends with a horizontal hair line mark 14. Link 9 is similarly scored with a hair line and the glass tube and the link with their markings thereon constitute the null indicator of the balance. Slight misalignment of the hair lines may be corrected by shifting or sliding the glass tube up or down in its support, grip 13.

The lower end of link 9 is connected to scale pan 15 which is provided on its bottom with a hook 16 to which is attached a second scale pan 17. Beneath pan 17 and pivotally carried on standard 1, so as to swing or turn on the standard in a horizontal plane, is an arm 18 provided with a flat supporting surface 19 adapted to receive a cup 20. Cup 20 is adapted to contain water or, in some cases, other liquids and is used to determine the weight of bodies in water by submerging the pan containing the body in the liquid.

As is usual, spring support 4 is provided with graduations as at 21 adapted for registration with an index point 22 on standard 1. The index point may be supplemented with vernier markings on the standard as shown at 23.

The apparatus so far described is representative of a conventional form of Jolly balance. The direct density reading attachment, which forms in combination with the apparatus described, the improved direct density reading balance, consists of a rotatable cylinder represented generally by the numeral 24, on which is mounted, by wrapping the same about the cylinder, a paper chart or scale 25 shown in detail in Fig. 5. Cylinder 24 is journaled in bearings 26 and 27 on brackets 28 and 29 respectively. The brackets are adapted for clamp-engagement with standard 1 by means of clutch plates 30 and wing nuts 31 (Fig. 3). Lower cylinder bearing 27 is provided with a knurled set screw 32 for frictionally engaging with the journal and clamping it against rotation in the bearing. As shown, brackets 28 and 29 are arranged to support cylinder 24 in a spaced, parallel position with respect to standard 1 of the balance.

Brackets 28 and 29 are also provided with projecting ears 33 adjacent the bearings, in which are mounted guide rails 34. The guide rails are simply smooth, polished rods, arranged parallel and headed as at 35 to prevent their upper ends from passing through the holes in upper ear 33. The lower ends of the rods are threaded to receive adjusting and lock nuts 36 where the rods pass through lower ear 33, as shown.

Vertically slidable on the guide rails is a reticule 37 which consists of a plate of Lucite or other transparent material such as glass, on which, on both front and back faces, are inscribed cross hairs as illustrated. The two sets of cross hairs provided on the front and back of the plate provide parallax control when reading density values from the cylindrical chart. The reticule is arranged to travel vertically up and down the chart upon corresponding movements of the spring support 4, by attachment, as by means of screws 38 to an arm 39. Arm 39 is rigidly attached, as by means of screws 40, to the end of a bracket 41, which is adjustably clamped to the spring support by means of clutch plate 42 and wing nuts 43.

The chart or scale 25 shown in Fig. 5, consists simply of a rectangular piece of paper of a width slightly greater than the circumference of cylinder 24 and of a length substantially equal to the length of the cylinder. On the paper is drawn or inscribed a rectangle of approximately the length of the cylinder and of a width substantially equal to the circumference of the cylinder. The long vertical marginal edges of the paper, outside the rectangle are provided with perforations which register with pins or threaded screw openings on the cylinder for securing the chart to the cylinder.

The disposition of the angularly disposed lines connecting the long opposite sides of the rectangle, represent a section of such lines taken from a pre-formed template, the section being that best adapted in scope to cover the working range of the spring of the balance. The template is prepared by drawing a straight, horizontal base line, of any suitable length but preferably longer than the circumference of the cylinder on which the chart is used. A second straight line is then drawn at right angles to the first line from a point above the first line to touch the left-hand end of the first line. The length of this second line is approximately equal to the height of the cylinder which should be substantially equal to the working range of the spring. The free ends of the two lines are then joined by a diagonal line. This latter line corresponds with the line marked L—L on the chart shown in Fig. 5. The second mentioned straight line which corresponds with the vertical line at the left side of the chart is then marked off in density values so that the portion of the line above any particular value or point is that fraction of the total length of the line which is equal to the reciprocal of the density; i. e., for the density 3, the mark or point is located one-third the way down from the top of the line. To complete the template, straight lines are drawn from all such points to the right-hand end of the horizontal line. This divides all vertical elements of the template between line L and the horizontal line into the same proportional parts.

In the modified form of the invention shown in Fig. 6, cylinder 24 is mounted coaxially on the standard of the balance, the cylinder being arranged if desired to turn directly on the standard and to be locked in position on the standard by a suitable set screw arrangement, not shown.

In operation of either form of balance the null indicator is adjusted to indicate zero length of spring with no weight on the pans and with the horizontal cross hairs on the reticule coinciding with the horizontal line at the bottom of the chart. This initial setting of the balance may be made with the scale 21 on the sliding spring support set at zero so that the instrument and the attachment may be used interchangeably. Next, a substance, in this case heavier than water, the specific gravity of which is to be determined, is then placed on the scale pan in air and the spring raised by means of knob 5 and balanced at the null indicator. In this position the cylindrical chart is rotated until the top sloping line marked L passes through the intersecting hairs on the reticule. The cylinder is then locked in position by means of knob 32 and the substance moved to the pan in water. After again balancing the spring at the null indicator, the specific gravity is read directly from the position of the intersecting cross hairs on the cylindrical chart which may be marked to read decimal units by the inclusion of a suitable system of colored lines (not shown).

Direct reading measurements of the specific gravity or density of liquids may be made with the balance of the present invention by substituting for, or adding to, the chart above described, another set of calibrations (not shown) constructed as above described but with a horizontal line at the top and a vertical line on the right-hand side of the chart. This vertical line would be divided into fractions of the density of a standard weight (substituted in place of the scale pans) starting with zero at the top and ending with the known density of the weight marked at the bottom of the line. For example, for a weight density ten, the line would be divided into ten equal divisions starting with zero at the top and ending with ten at the bottom.

The Jolly balance of the present invention is easy to manipulate and is accurate and sturdy. Its use results in a substantial saving of time and labor and because of the novel arrangement of its parts it is relatively simple in structure and inexpensive to build.

What I claim is:

1. A Jolly balance useful for determining the density of a substance and including a base, a vertically adjustable spring support carried by the base, a spring suspended from the support and a null indicator for the spring, the improvement which comprises a chart carried by the base, said chart being provided with an index and calibrated to read in density values directly, and a reticule arranged for actuation by movement of the spring support to move over the chart, said chart being movable with respect to the reticule to present scales of different magnitude to said reticule in accordance with the weight of the substance measured, said reticule being adapted to register with the index on the chart when, with no load on the spring, the null indicator registers zero.

2. A Jolly balance including a base, a vertically adjustable spring support carried by the base, a spring suspended from the support and a null indicator for the spring, the improvement which comprises a vertically disposed chart carried by the base, said chart being provided with an index and calibrated to read in density values directly, a reticule carried by the spring support and adjustable vertically therewith to move along a vertical element of the chart, said chart being movable to present scales of different magnitude to said reticule, and said reticule being adapted to register with the index on the chart when, with no load on the spring, the null indicator registers zero.

3. A Jolly balance including a base, a vertically adjustable spring support carried by the base, a spring suspended from the support and a null indicator for the spring, the improvement which comprises a vertically disposed, rotatable, cylindrical chart carried by the base, said chart being provided with an index and calibrated to read in density values directly, and a reticule carried by the spring support and adjustable vertically therewith to move along an element of the chart, said reticule being adapted to register with the index on the chart when, with no load on the spring, the null indicator registers zero.

4. The subject matter of claim 3 wherein the longitudinal axis of the cylindrical chart and the longitudinal axis of the base and the vertically adjustable spring support coincide.

5. The subject matter of claim 3 wherein the longitudinal axis of the cylindrical chart is spaced from but parallel to the longitudinal axis of the spring support.

6. The subject matter of claim 3 wherein means is provided for releasably securing the rotatable, cylindrical chart at any desired degree of rotation.

7. In a Jolly balance a base, a vertically, adjustable standard mounted on the base, a balance spring suspended from the standard, the point of suspension of the spring being adjustable vertically along the standard, an index mark on the base, an index mark on the free end of the spring, a vertical, rotatable cylindrical chart, carried by the base, an index mark on the chart, and a reticule attached to the adjustable standard and movable therewith, said reticule being adapted to register with the index mark on the chart when the index mark on the base is in registration with the index mark on the free end of the spring with no load on the spring, said cylindrical chart being calibrated along vertical elements of different lengths such that the elements are divided into upper and lower segments, the lengths of the upper segment of any element being that fraction of the total of the element that is equal to the reciprocal of a unit of density.

LOTHROP H. BAILEY.